United States Patent [19]

Janssen

[11] 3,876,827

[45] Apr. 8, 1975

[54] APPARATUS FOR READING A DISC-SHAPED RECORD CARRIER

[75] Inventor: Peter Johannes Michiel Janssen, Emmasingel, Eindhoven, Netherlands

[73] Assignee: U.S. Philips Corporation, New York, N.Y.

[22] Filed: Oct. 29, 1973

[21] Appl. No.: 410,774

[30] Foreign Application Priority Data

Nov. 11, 1972 Netherlands ...................... 7215307

[52] U.S. Cl.......... 178/7.1; 179/100.3 V; 178/6.7 R

[51] Int. Cl. ............................................ H04n 3/16

[58] Field of Search......... 178/7.1, 6.7 R; 179/100.3

[56] References Cited

UNITED STATES PATENTS 3,381,086 4/1968 Moss et al........................... 178/7.1

*Primary Examiner*—Richard Murray

*Attorney, Agent, or Firm*—Frank R. Trifari; Simon L. Cohen

[57] ABSTRACT

The invention relates to a device for reading a disc-shaped record carrier on which information is stored in tangentially arranged tracks. In order to keep the scanning point in track, a radial tracking system is provided. Moreover, in order to eliminate the effect of an out-of-roundness or eccentricity of the record carrier on the time base of the detected signal, a tangential tracking system is provided, which can cause a movement of the scanning point in the tangential direction. The control signal for said tangential tracking system is derived from the control signal for the radial tracking system with the aid of a phase-shifting element which causes a phase shift which corresponds to one fourth of a revolution period of the record carrier.

4 Claims, 5 Drawing Figures

APPARATUS FOR READING A DISC-SHAPED RECORD CARRIER

Figure 1:
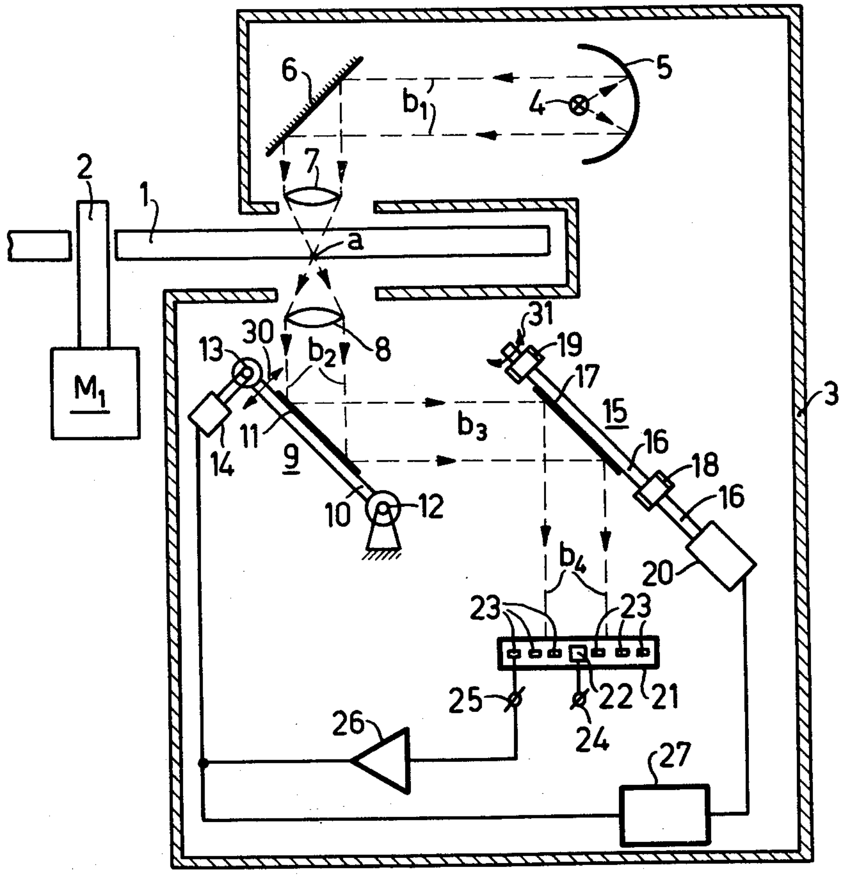

The invention relates to an apparatus for reading a disc-shaped record carrier on which signals are stored in tangentially arranged tracks comprising a read unit provided with directing means and a read detector, the information stored in the scanning point of the record carrier being transferred to the read detector by means of the directing means, a measuring detector for measuring the radial orientation position of the scanning point relative to the desired track, a first movable element included in the directing means to which a first control signal derived from the measuring detector is applied and which by a movement in accordance with said first control signal controls the radial position of the scanning point, and a second movable element incorporated in the directing means, which in accordance with a second control signal controls the tangential position of the scanning point.

The invention in particular relates to an apparatus for reading a disc-shaped record carrier on which optically coded signals are stored and which are read with the aid of a radiation source, which emits a beam which by means of the directing means transfer the information stored in the scanning point of the record carrier to an optical read detector.

Such a device is known from United States Pat. No. 3,381,086, which describes a device for reading a video signal which in optical form is stored on a disc-shaped record carrier. In this known device the directing means consists of a prismatic element having two mirror faces, which are disposed at an accute angle relative to each other and to the beam emerging from the record carrier. Said prismatic element is rotatable about two different axes, so as to enable both the radial position and the tangential position of the scanning point on the record carrier to be controlled. In this respect the scanning point is to be understood to mean that point of the record carrier which is eventually imaged on the read detector and which is read.

This control of the radial and the tangential position of the scanning point is necessary, because for example owing to out-of-roundness of the disc-shaped record carrier or an eccentricity of the pivot point of the disc-shaped record carrier, the information track is no longer concentrically or spirally arranged about the pivot point. This means that, although in the case of a spiral configuration of the information track on the record carrier a coarse control is provided by which the optical read unit is radially moved wwth such a speed that a distance is covered per revolution of the record carrier corresponding to the pitch of the spiral, fine control the radial position of the scanning point is also necessary in order to compensate for the deviations. Moreover, fine control of the tangential position of the scanning point is required, because of said deviations may also give rise to time-base errors of the detected signal, which errors can be compensated by controlling the tangential position of the scanning point.

In said known device the position of the scanning points is shifted radially by tilting the prism about a first axis, and the scanning point is shifted tangentially by tilting the prism about a second axis. The control signal for the radial positioning of the scanning point is obtained with the aid of two photo-cells, which are arranged at either side of the prism, and when the scanning point is correctly positioned on the track, each intercept the same amount of light. When the scanning point is off the track the two photo-cells receive a different amount of light. This difference in the intercepted amount of light is employed to produce a first control signal, which provides an indication of both the direction and magnitude of the radial deviation of the scanning point relative to the desired track. The prismatic element are rotated with the aid of said control signal so as to ensure that the scanning point always keeps in track.

In said known device the control signal for the tangential positioning is obtained by extracting the synchronizing-pulse train from the detected video signal. With the aid of a phase detector the difference in phase is measured between the pulse train and the pulse train produced by a stable oscillator. This yields a control signal which is used to tilt the prismatic element about the tangential positioning axis.

For the production of the control signal for the tangential positioning this known device therefore requires both a stable oscillator and a phase detector, which are relatively expensive.

Furthermore, this known device has the undesirable feature that in the event of a speed variation of the record carrier the output signal of the phase detector increases or decreases monotonously because the difference in phase between the two pulse trains then changes monotonously. This leads to an excessive travel of the mirror, and even to the mirror becoming stuck.

It is an object of the invention to provide a device of the type mentioned hereinbefore, in which the control signal for tangential positioning of the scanning point is obtained in a very simple and inexpensive manner, thus obviating those drawbacks. The invention is characterized in that the second control signal is derived from the first control signal with the aid of a phase-shifting element, which causes a phase shift which is equal to one fourth of a revolution period of the record carrier. It is evident, that the second control signal may then not only be derived directly from the first control signal, but also indirectly from the excursion of the first movable element which is caused by the first control signal.

The invention is based on the recognition of the fact that there is a unambigeous correlation between time base errors of the detected signal which are caused by an eccentricity or out-of-roundness of the disc-shaped record carrier and the resultant radial deviations of the scanning point. The invention utilizes this fact by deriving a second control signal for tangential positioning from the first control signal for radial positioning, which in an extremely simple manner yields a suitable control signal for tangential positioning In this respect it is to be noted that the scope of the invention is not at all limited to an optical read device for an optically coded record carrier as described hereinbefore, but that it equally applies to differently coded record carriers. As an example a disc-shaped record carrier is mentioned having a magnetic layer which information is stored in a spiral or concentric track. Said information can be read with the aid of a magnetic head, which is arranged above the disc. By including said magnetic head both in a radial and in a tangential positioning system, the effect of an out-of roundness or eccentricity of the record carrier can be eliminated.

Figure 2A:
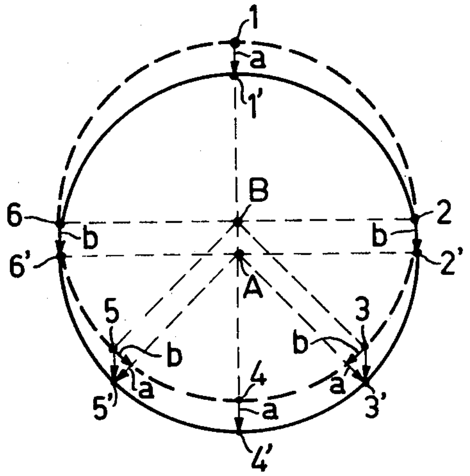
Figure 2B:
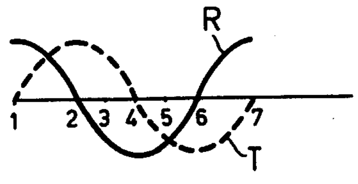
Figure 3:
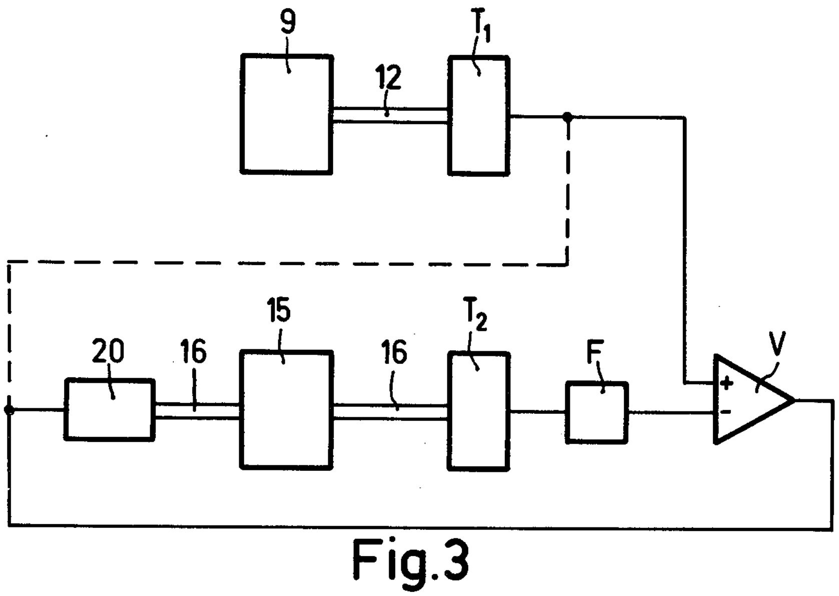
Figure 4:
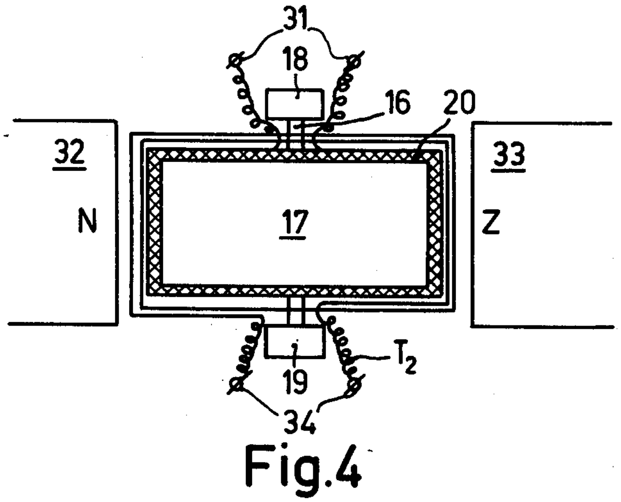

The invention will be described in more detail, by way of example, with reference to the drawing, in which:

FIGS. 1, 3 and 4 schematically show embodiments of the device according to the invention, and FIGS. 2a and 2b show two characteristics to illustrate the operation of said device.

FIG. 1 shows a disc-shaped record carrier 1, which is rotated by a motor $M_1$ via a shaft 2 which passes through a central opening in said record carrier. The record carrier may be a solid disc of a rigid material on a thin foil. On the record carrier 1 an information track is provided, which is generally spiral-shaped and in which, for example, a video signal can be stored in optical form.

The information stored on the record carrier is read with the aid of an optical system which is accommodated in a housing 3. This housing 3 can be subjected to a continuous radial displacement by means of a drive system, not shown, with such a speed that the displacement per revolution of the record carrier for example equals the pitch of the spiral rack on the record carrier.

The optical system first of all comprises a light source 4 and a concave mirror 5, by which the light coming from the light source is collimated to a beam $b_1$. This beam $b_1$ is reflected to the record carrier by means of a plane mirror 6. By means of a lens 7 it is focussed onto the surface of the record carrier on which the information is stored, in this case by way of example, the lower surface. The emerging beam which is modulated by said information is again collimated into a beam $b_2$ via a lens 8. This beam $b_2$ is reflected by a mirror element 9 to a beam $b_3$, which in turn is reflected by a mirror element 15 to a beam $b_4$. This last beam $b_4$ eventually impinges on a detector unit 21. The scanning point *a* of the record carrier is then imaged onto a read detector 22, which detects the information contained in the beam. After this the information becomes available at an output terminal 24 in the form of an electrical signal and, possibly after further processing, can be applied to the playback equipment.

Radial positioning of the scanning point *a* on the record carrier is effected with the aid of the mirror element 9. Said mirror element 9 comprises a reflecting layer 11, which is applied on a carrier 10. This carrier 10 is pivoted at one end about a shaft 12 which is perpendicular to the plane of the drawing, while its other end 13 can be moved by a drive element 14 in such a way that the carrier 10 is rotated about the shaft 12 (see arrow 30). Owing to the rotation of the mirror element the scanning point *a* which is imaged onto the read detector 22 via said mirror element is subject to a radial displacement, assuming that the area of the record carrier which is illuminated by the beam covers several tracks.

The information about the position of the scanning point *a* relative to the information track which is required for this radial control is obtained with the aid of the measuring detector 23 which is incorporated in the detector unit 21. This measuring detector 23 may take several forms, for example as described in the the aforementioned U.S. Pat. or as described in U.S. Pat. No. 3,833,769.

According to one embodiment of the last-mentioned possibility the measuring detector 23, which is schematically shown in FIG. 1, consists for example of a grating of radiation-transmitting and radiation-absorging strips. In FIG. 1 this grating is shown considerably enlarged and in reality it will have to be located within the radiation beam $b_4$. As the beam illuminates a number of tracks of the record carrier, for example 50, an image is obtained on the measuring detector, which corresponds to the track pattern on the record carrier, so that said image will also have a grating structure. The position of this grating-like image of the track pattern relative to the grating-shaped detector with the aid of suitable transducer elements yields a signal which is representative of the position of the scanning point *a* relative to the desired track, said signal being available at an output terminal 25 of the measuring detector. The control signal available at the terminal 25 is via a control amplifier 26 fed to the drive system 14 for the mirror element 9, so that eventually the scanning point *a* is controlled so as to remain in track.

Tangential positioning of the scanning point *a* of the record carrier is achieved with the aid of the mirror element 15. Said mirror element 15 is constructed in an identical manner as the mirror element 9 and comprises a reflecting layer 17, which is provided on a carrier 6. The carrier 16, however, is now pivoted in two bearings 18 and 19, and can consequently be rotated in the direction of the arrow 31 about an axis of rotation in the plane of the drawing. The rotary movement of the mirror element 15 can be achieved with the aid of a drive element 20 which is connected to the carrier 16.

According to the invention the control signal required for said drive element 20 is derived from the control signal for radial positioning. In the shown embodiment the control signal for tangential control is taken from the control amplifier 26. In order to be suited for tangential control this signal should in any case be subjected to a phase shift which corresponds to one fourth of one revolution period of the record carrier. This phase shift is obtained with the aid of a unit 27, which in its simplest form may consist of passive element, for example, a resistor and a capacitor.

The characteristics shown in the FIGS. 2*a* and 2*b* serve to illustrate that in this manner a suitable control signal for tangential control can be obtained. The continuous line in FIG. 2*a* represents a track which is concentric with a center A. To illustrate the effect of an eccentricity of the pivot point, a second circular track with a center B is represented by an interrupted line. The deviations between the two circular tracks have been determined for different angular positions about the centers A and B.

This readily shows that both the radial deviation and the tangential deviation vary sinusoidally, but are 90° shifted in phase relative to each other. Between the points 1, 1' and 4', which points are located in line with the line AB, only a radial deviation exists, so that in point 1 of FIG. 2*b* the radial deviation R is for example max. positive and in point 4 max. negative, the tangential deviation T in both points being zero. Between the points 2, 2' and 6, 6', which are perpendicular to the line AB of the two circular tracks, there is only a tangential deviation, so that in points 2 and 6 of FIG. 2*b* the radial deviation R is zero. Finally, the deviations between points 3, 3' and 5, 5' comprise both a radial component a and a tangential component *b*. Eventually, a response is found for these two deviations as shown in FIG. 2*b*, from which it is apparent that there is a unambiguous relation between the two deviations, viz. a 90° phase shift. This implies that a suitable control signal for tangential tracking can be obtained by subjecting the control signal for radial tracking to such a phase shift.

Preferably, the necessary phases shift is obtained with the aid of an integrating network, because this excludes possible disturbing high-frequency components from the control signal.

Naturally, further steps can be taken to obtain a desired servo behavior of the tangential tracking system. As this tangential tracking system is an open-loop system, it may first of all be desirable, to apply feedback, for example velocity feedback.

An extremely suitable control signal for the tangential tracking system can be obtained in a very simple manner by providing the mirror element 9 with a tachometer as is schematically shown in FIG. 3. Said tachometer $T_1$, which may be mounted on the shaft 12, provides a signal which is proportional to the mirror velocity, i.e., porportional to the derivative of the mirror displacement, which corresponds to a 90° phase shift. This means that the signal from said tachometer can be used directly as control signal for the drive system 20 of the mirror element 15, as is indicated in FIG. 3 by the interrupted line.

By also mounting a tachometer $T_2$ on the shaft 15 of said mirror element 15, the tangential tracking system may be converted into a quasi-closed system. The signal from one of the tachometers may then be applied to a network F, which introduces a phase shift corresponding to one fourth of the revolution period of the record carrier, after which this phase-shifted signal is compared with the signal from the other tachometer with the aid of a comparator circuit V. By using the difference signal as control signal for the drive system 20, it is achieved that the movement of the mirror element 15, except for the 90° phase-shift is locked to the movement of the mirror element 9. As the latter mirror element 9 is included in a closed control loop, the mirror element 15 is, as it were, also included in a closed control loop.

The use of a tachometer for obtaining a control signal for the tangential tracking system has the advantage that the production of this control signal is based on the actual position of the radial mirror element. When the control signal for the drive system 14 of this mirror element 9 is used for deriving a control signal for the tangential tracking system, a deviation may occur as a result of the mass inertia of said mirror element 9. Owing to this mass inertia there may be a certain difference between the position dictated by the control signal and the actual position of said mirror element 9.

Further, it will be apparent to those skilled in the art that the scope of the invention is not at all limited to the embodiment which is schematically shown in FIG. 1. For example, the invention is not at all limited to the arrangement of the mirror elements shown in the FIG. 2. Obviously, the two mirror element may be combined in a manner as described in said U.S. Pat. No. 3,381,086.

A simple embodiment of the mirror element is for example described in copending U.S. Pat. Application Ser. No. 335,934, filed Feb. 26, 1973, construction of which is shown in FIG. 4, which represents the mirror element 15. Said mirror element now consists of a flat mirror layer which is disposed on a shaft 16, which extends through its centre of gravity. Said shaft 16 is supported in two bearing blocks 18 and 19. The drive element 20 is constituted by a number of filamentary windings, which are arranged around the mirror layer and to whose two ends 31 a control signal can be supplied. The mirror with the filamentary windings is located in a permanent-magnet field, which is produced by two magnet poles 32 and 33.

In this embodiment of the mirror element a tachometer $T_2$ can be obtained in a simple manner by providing a number of additional filamentary windings, at whose two ends 34 the desired tachometer signal is available. Instead of mirrors it is also possible to use elements which transmit the light and which by rotation cause the light beam to be diffracted. The embodiment of the measuring detector for the radial tracking system is neither essential for the invention.

Finally, the invention equally applies to a device in which the disc-shaped record carrier is not scanned by means of a transmitted light beam, but in which said light beam is reflected by the disc (see for example the aforementioned copending U.S. Pat. Application).

What is claimed is:

1. Apparatus for reading a rotating disc-shaped record carrier on which signals are stored in tangentially arranged tracks, comprising read unit means for scanning the tracks of the record carrier, first signal controlled means for radially moving the scanning of the read unit means with respect to the record carrier, second signal controlled means for tangentially moving the scanning of the read unit means with respect to the record carrier, a measuring detector for measuring the radial position of the read unit scan relative to a desired scanning point on the tracks of the record carrier and for providing a first control signal corresponding to said relative position, means connecting said first control signal to said first signal controlled means, and phase shift means connected to said second signal controlled means and providing a phase shift equal to one fourth of one revolution period of the record carrier for deriving a second control signal from the first control signal.

2. A device as claimed in claim 1, wherein said phase shift means comprises an integrating circuit.

3. A device as claimed in claim 1, wherein said phase shift means comprises a tachometer connected to said first signal controlled means for providing a signal proportional to the radial speed of the read unit means.

4. A device as claimed in claim 3, further comprising a second tachometer connected to said second signal controlled means for providing a signal proportional to the tangential motion of the read unit means, wherein said phase shift means is connected to the output of at least one of said two tachometers, a comparator connected to the output of said phase shift means and to the output of the tachometer not connected to the phase shift means, and means connecting the output of the comparator to the second signal controlled means as a control signal.

* * * * *

UNITED STATES PATENT AND TRADEMARK OFFICE

CERTIFICATE OF CORRECTION

PATENT NO. : 3,876,827

DATED : April 8, 1975

INVENTOR(S) : PETER JOHANNES MICHIEL JANSSEN

It is certified that error appears in the above-identified patent and that said Letters Patent are hereby corrected as shown below:

IN THE SPECIFICATION

Col. 1, line 51, "wwth" should be --with--;

Col. 4, line 53, "and 4' " should be --and 4, 4'--;

Signed and Sealed this

*ninth* Day of *December 1975*

[SEAL]

*Attest:*

RUTH C. MASON
*Attesting Officer*

C. MARSHALL DANN
*Commissioner of Patents and Trademarks*